United States Patent
Otruba

(10) Patent No.: US 7,735,629 B2
(45) Date of Patent: Jun. 15, 2010

(54) STAR WHEEL SYSTEM WITH PASSIVE STAR WHEEL AND METHOD FOR SEPARATING CONTAINERS BEING PROCESSED

(75) Inventor: Svatoboj Otruba, Ceres, CA (US)

(73) Assignee: B&H Manufacturing Company, Inc., Ceres, CA (US)

( * ) Notice: Subject to any disclaimer, the term of this patent is extended or adjusted under 35 U.S.C. 154(b) by 0 days.

(21) Appl. No.: 11/941,064

(22) Filed: Nov. 15, 2007

(65) Prior Publication Data

US 2009/0127071 A1    May 21, 2009

(51) Int. Cl.
*B65G 47/26* (2006.01)
(52) U.S. Cl. .................. 198/459.2; 198/480.1; 198/723
(58) Field of Classification Search ............. 198/459.2, 198/480.1, 481.1, 723
See application file for complete search history.

(56) References Cited

U.S. PATENT DOCUMENTS

| | | | | |
|---|---|---|---|---|
| 1,212,754 | A | * | 1/1917 | Fleischer ................. 198/480.1 |
| 1,667,991 | A | * | 5/1928 | Russell .................... 198/463.4 |
| 2,269,422 | A | * | 1/1942 | Ayars ....................... 198/480.1 |
| 2,570,265 | A | * | 10/1951 | Nordquist et al. ........ 198/463.4 |
| 3,330,402 | A | * | 7/1967 | Schlueter .................... 198/458 |
| 3,553,927 | A | | 1/1971 | Anglade, Jr. |
| 4,216,854 | A | * | 8/1980 | McCoy .................... 198/479.1 |
| 5,695,041 | A | * | 12/1997 | Kouda et al. ............. 198/459.2 |
| 5,772,001 | A | * | 6/1998 | Otruba et al. ............. 198/459.2 |
| 6,510,938 | B1 | * | 1/2003 | Bowlin ....................... 198/450 |

OTHER PUBLICATIONS

International Search Report of International Application No. PCT/US08/83127 dated Jan. 7, 2010.

* cited by examiner

*Primary Examiner*—Mark A Deuble
(74) *Attorney, Agent, or Firm*—Haynes and Boone, LLP

(57) ABSTRACT

A linear stream of articles is conveyed to a processing station, a first one of said articles positioned in front of and in physical contact with a second one of said articles and the second one of said articles positioned in front of and in physical contact with a third one of said articles. A motor-driven rotary star wheel moves one-by-one said articles from a conveyor to a downstream processing station and is assisted in separating adjacent articles by a passive star wheel with a plurality of contoured arms separated by concave pockets. The passive star wheel receives one-by-one said articles in adjacent pockets and the contoured arms of the passive star wheel separate each article from the next following article. A guide section causes each article being separated to more along a generally tangential path relative to both star wheels as they rotate.

9 Claims, 3 Drawing Sheets

STAR WHEEL SYSTEM WITH PASSIVE STAR WHEEL AND METHOD FOR SEPARATING CONTAINERS BEING PROCESSED

FIELD OF THE INVENTION

This invention relates to machines for labeling containers and in particular to a method and structure for separating each container in a line of containers being processed (such as by being labeled) so that each container can be separately processed.

INTRODUCTION

On a typical container production line (such as a line that uses a machine for inspecting or labeling containers) containers usually reach the packaging machine in a single file line touching each other. For processing them (applying labels, or inspecting them, or other functions) containers must be separated from each other by at least the processing distance. This task is usually accomplished by a variable pitch feed screw or by a star wheel system (as described in U.S. Pat. No. 5,772,001, for example). The objective is to maintain a constant speed of moving the containers in a single file along the longitudinal axis of the infeed conveyor but at the same time, to separate each container from contact with the next following container before the container is further processed. The star wheel system described in U.S. Pat. No. 5,772,001 accomplishes this task but the use of this system for handling small diameter containers or for handling containers which are deformable is limited. U.S. Pat. No. 5,772,001 is hereby in its entirety incorporated by reference into this specification.

One purpose of this invention is to provide a better functioning star wheel system which eliminates the commonly-used feed screw. Such a system would enable simple handling of all containers at a higher speed than is possible with current systems.

DESCRIPTION

In accordance with this invention, a system is provided which includes a constant velocity star wheel which is driven at a rate required by the machine function in combination with a free wheeling passive flow star inserted in a moving single file of containers. In one embodiment of this invention, appropriate outside and inside container guides are provided to control the path of the containers' movement. The speed of the containers in the axis of the conveyor is determined by the profile of the constant velocity star wheel, the profile of the passive flow star wheel and the shape of the containers' guides. To prevent loading of more than one container in the pocket of the constant velocity star wheel, the passive flow star effectively creates a barrier between two directly adjacent containers coming from the conveyor. The passive flow star can, during forward motion of the containers', create a gap between two directly adjacent containers as the tip of the constant velocity star wheel is advancing to separate each container from the single file of containers. This way even small containers or containers which are experiencing deformation from line pressure can be effectively separated and delivered with the required spacing to the machine for further processing. At the same time, because of mutual geometric relations among involved parts and containers, any speed profile required for each container as it is progressing on the conveyor can be achieved by properly shaping the profile of the constant velocity star wheel.

This invention will be more fully understood in view of the following detailed description taken together with the drawings.

DETAILED DESCRIPTION

The following description is illustrative only and not limiting. Other embodiments of this invention will be obvious in view of this description to those skilled in the container processing and labeling arts.

Figure 1A:
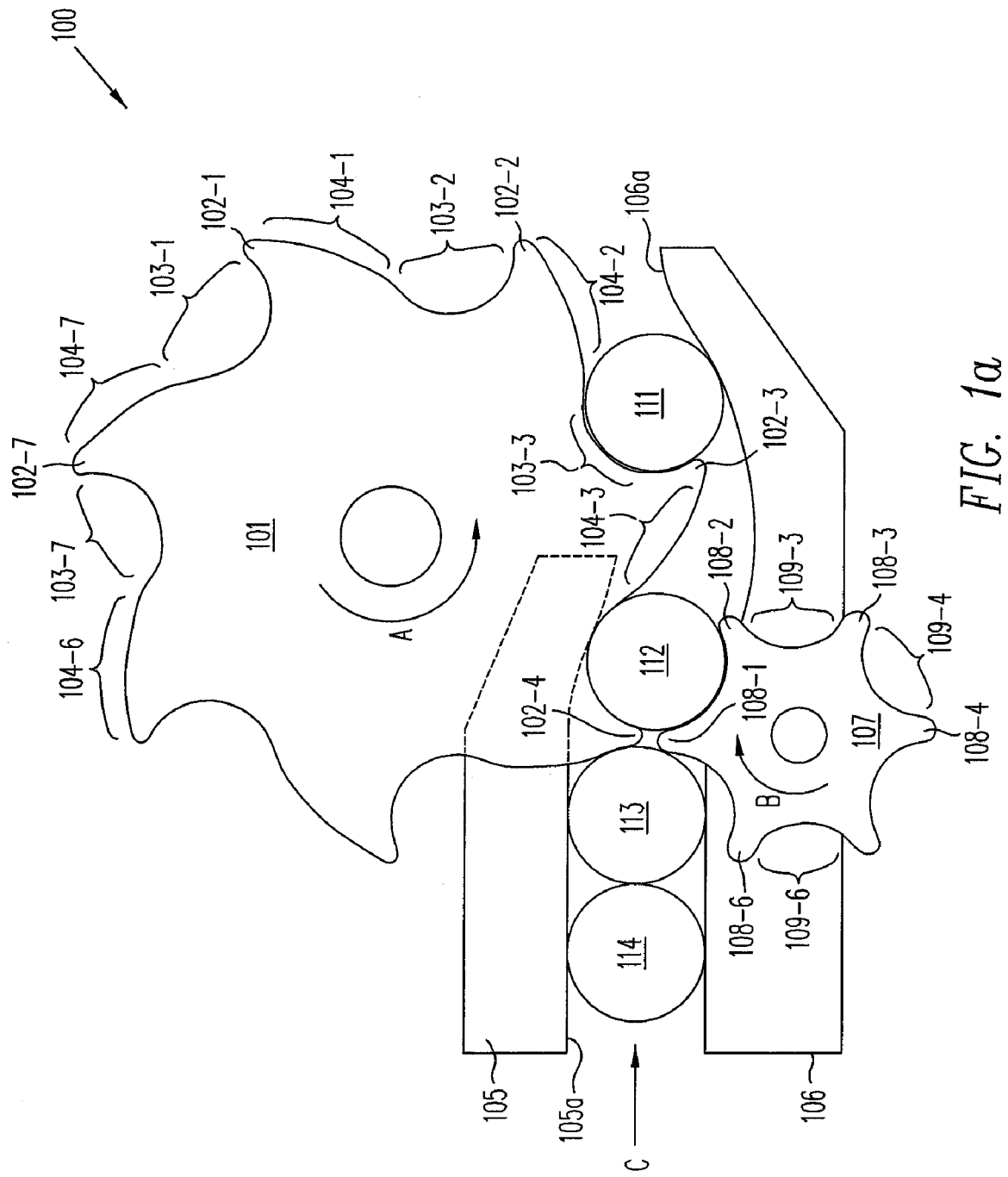
FIGS. 1a, 1b and 1c show plan views of structure in accordance with one embodiment of this invention at three different times during the operation of this structure to separate a lead container from direct contact with the next following container as the two containers travel along a conveyor, the separation being in preparation for transferring the lead container to, for example, a labeling station which is part of a labeling machine.

FIG. 1a shows in plan view structure 100 of one embodiment of this invention as used to position containers for the placement of labels on the containers. If desired, this embodiment can be used to position containers for other processing steps such as inspection or for loading containers on to the platform of carousel style machines such as filler machines, inspection machines, labeling machines, and similar machines containing rotating platforms for holding containers for further processing functions. In FIG. 1a, constant velocity star wheel 101 is driven by a motor (not shown) in a well known manner. Star wheel 101 has a plurality of contoured arms such as arms 102-1 to 102-7 (although other numbers of contoured arms can be used on the constant velocity star wheel 101 if desired). Star wheel 101 in one embodiment rotates at a constant velocity when the conveyor (not shown) brings the containers to star wheel 101 at a constant velocity.

In the embodiment shown, a plurality of articles such as containers 1, 2 and 3, are being moved in a substantially continuous stream in preparation in this embodiment for the application of labels to the containers. Star wheel 101, having a plurality of contoured arms 102-1 to 102-7, is rotated counterclockwise in the direction of arrow A such that the contoured arms 102 each individually move a corresponding article from the conveyor to a station downstream where an operation, such as the placing of a label on the container or inspection of the container, can be carried out. Each of the contoured arms 102 has a leading convex surface 104 (sometimes called a "cam surface") and a leading concave surface 103 which defines a pocket shaped to partially receive one of the containers. The cam surface 104-$i$ (such as cam surface 104-2 associated with contoured arm 102-2 on star wheel 101) of the corresponding contoured arm 102-$i$ (where "i" is an integer given by $1 \leq i \leq I$ where "I" is the maximum number of contoured arms on the star wheel 101) guides a container into the concave pocket 103-($i$+1) defined by the leading surface of the following adjacent arm 103-($i$+1). The leading surface 103-($i$+1) of the next-following adjacent arm 103-($i$+1) moves the container toward the downstream station. At this station a segment of material may be applied in a well-known manner to the exterior surface of the container.

The feed apparatus of this invention, also includes passive flow star wheel 107 which is rotated by the force created by a container being pressed against one of the contoured arms 108 of the star wheel 107. Shown in FIG. 1a are contoured arms 108-1 to 108-6 on passive star wheel 107. Of course other numbers of contoured arms 108 can be used on passive star wheel 107 depending on the requirements of the system 100. Each contoured arm 108 is separated from the two adjacent contoured arms by a concave pocket. For example, contoured arm 108-3 is separated from contoured arm 108-2 by concave pocket 109-3 and is separated from contoured arm 108-4 by concave pocket 109-4.

During operation, containers such as containers 1, 2 and 3 shown in FIG. 1a are brought to the constant velocity star wheel 101 by a conveyor, for example. A container identified as container 111 is shown as having been separated from the previously following but directly-adjacent container 112 by the cam surface 104-2 of contoured arm 102-2 and then embraced by concave pocket 103-3 associated with the next-following contoured arm 102-3. As star wheel 101 rotates counterclockwise, container 111 is moved away from the directly-following container 112. This movement is assisted by passive star wheel 107. Thus container 111 has rested in concave pocket 109-3 of passive star wheel 107 as container 111 is moved away from container 112 by star wheel 101. However, contoured arm 108-2 has inserted itself between container 111 and container 112 and thus has forcibly separated these two containers from each other. Passive star wheel 107 is rotated clockwise in the direction of arrow B by the constant velocity star wheel 101 which applies a pushing force to container 111, for example, thereby moving container 111 away from container 112 and at the same time, because of the placement of container 111 in concave pocket 109-3 of passive star wheel 107, causing star wheel 107 to rotate in the direction of arrow B.

Thus star wheel 107 assists in the separation of directly adjacent containers being brought to the downstream workstation to be processed by passively being rotated and while being rotated inserting a contoured arm 108 between directly adjacent containers.

Figure 1B:
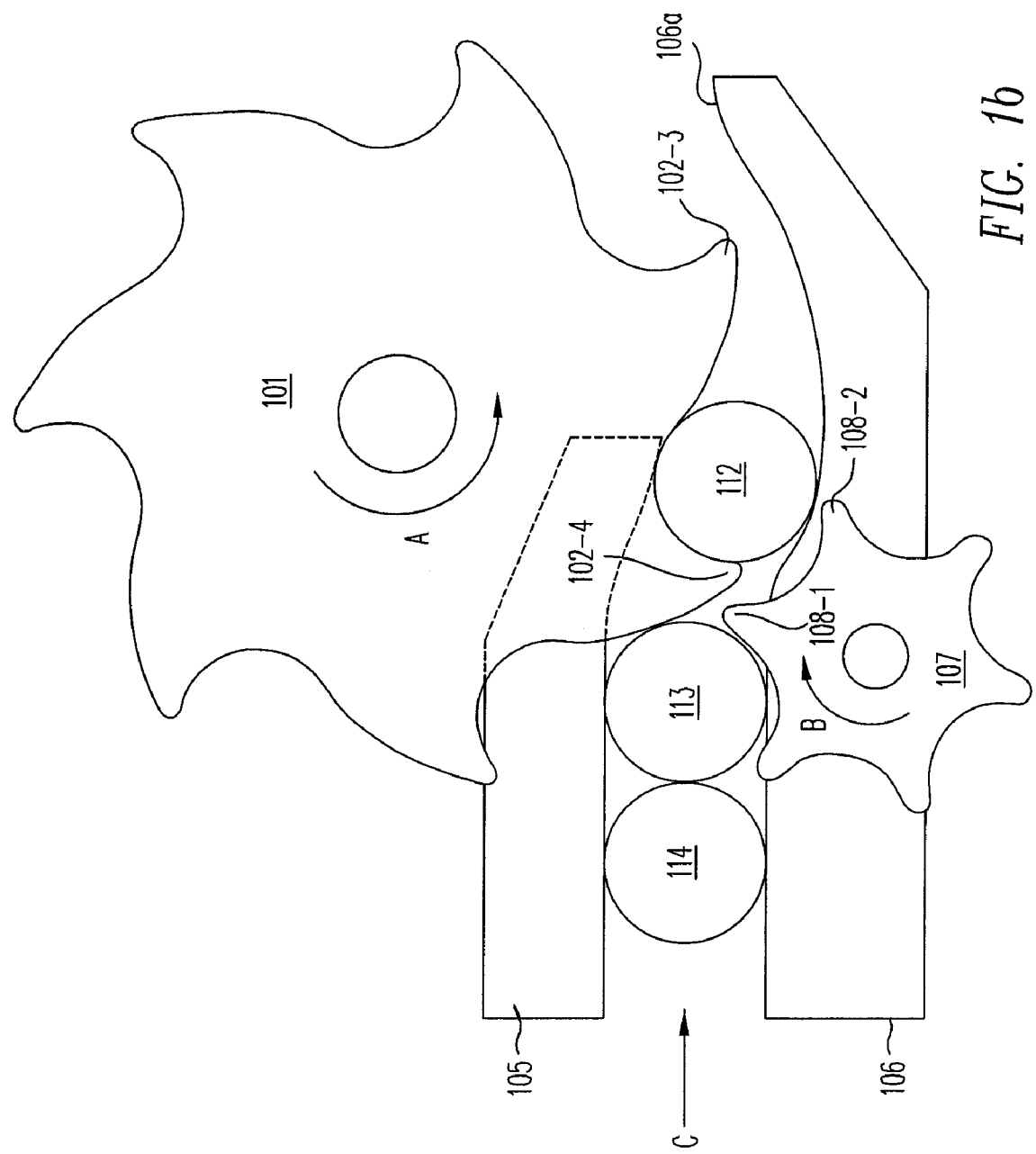

FIG. 1b shows the structure after container 111 has been successfully sent to the processing station and container 112 has been separated from its next following container 113 in preparation for container 112 to be sent to the processing station. Note that container 112 has been reached by and is thus in contact with the concave surface 103-4 associated with contoured arm 102-4 on star wheel 101. Note further that container 112 is also being separated from container 113 by the insertion of contoured arm 108-1 on passive star wheel 107 between container 112 and container 113. Container 112 is being moved out of concave pocket 108-2 by the counter-clockwise rotation of star wheel 101. Contoured arm 108-2 is dropping away from container 112 to allow container 112 to move along the interior arcuate surface 106a of outside container guide 106 Interior surface 106a of guide 106 is arcuate (concave facing the containers) to guide each container to the work station (not shown) for further processing. Guide 106 works together with inside container guide 105 and in particular with the inside surface 105a thereof, to ensure that the containers being transferred to the downstream work station are properly constrained so that the can be separated by the two star wheels 101 and 107 working together as described herein.

Figure 1C:
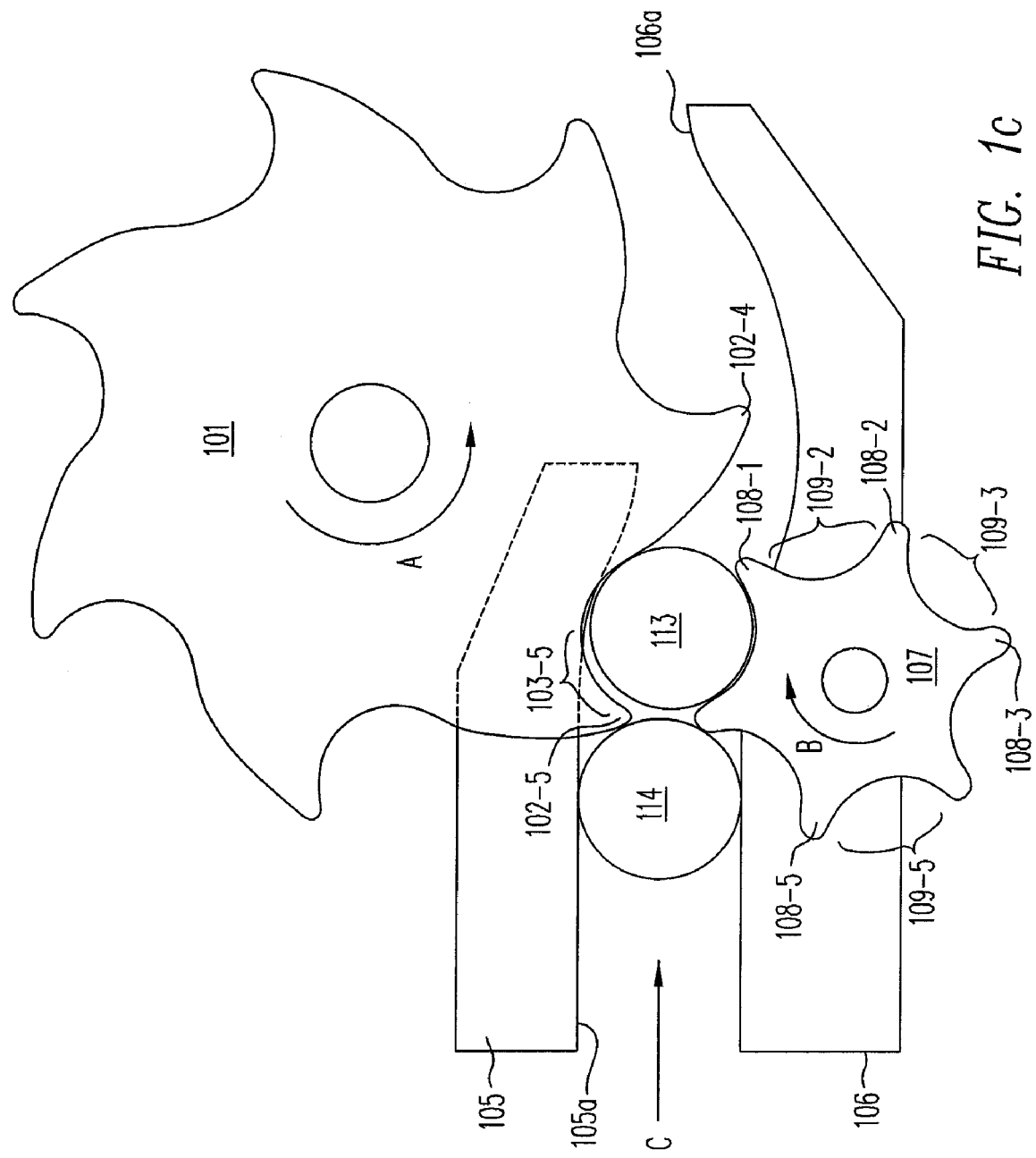

FIG. 1c shows the system when container 112 has been transferred to the downstream processing station for further processing and container 113 is just starting to be separated from the next following container 114. Arm 108-6 of passive star wheel 107 is being inserted between containers 113 and 114 thereby assisting in the separation of these two containers. Concave pocket 103-5 is about to embrace container 113 such that cam surface 104-5 associated with contoured arm 102-5 will guide container 114 together with the interior shaped surfaces 105a and 106a of guides 105 and 106. Contoured arm 108-6 assists in separating container 113 from container 114 as passive star wheel 107 rotates in response to a pushing force transmitted by container 113 from contoured arm 102-5 of star wheel 101 driven by a motor (not shown).

The result of this structure is the ability to separate in preparation for further processing of linearly advancing containers in direct contact with each other thereby to allow the rapid and smooth processing of the separated containers at a high speed. Typical processing rates associated with this system when used for applying labels to containers are in the range of 300 to 1200 containers per minute A benefit of this invention is that containers are separated from each other without any abrupt change in speed and direction (i.e. without an abrupt change in the speed vector). Another way of saying this is that in the same time line speed is not changing. This prevents line vibration and overloading of involved mechanical parts and thus prevents damages to containers. This process is similar to the use of a feed screw with progressive pitch to separate containers but has the advantage that only one passive star wheel is required whereas in the case that containers are tall or unstable, two feed screws, one above the other must be used. The starwheel system of this invention is accomplishing the same task with a much simpler structure while maintaining each container in its vertical position and also overcoming line pressure which is a problem for the feed screw system. The starwheel system of this invention is using line pressure for its benefit and therefore line pressure does not present a problem during system operation.

What is claimed is:

1. An article handling machine comprising:
   a conveyor for supplying a linear stream of articles to a processing station, a first one of said articles positioned in front of and in physical contact with a second one of said articles and said second one of said articles positioned in front of and in physical contact with a third one of said articles, and
   a rotary star wheel apparatus for individually moving one-by-one said articles from said conveyor to a downstream processing station, said star wheel apparatus having a plurality of contoured arms and at least one pocket shaped to at least partially receive one of said articles for transport of said one of said articles from said conveyor to said processing station along a tangential path relative to said star wheel apparatus;
   a passive star wheel with a plurality of contoured arms separated by concave pockets in said passive star wheel for receiving one-by-one said articles and for assisting in separating each article from the next following article wherein the circumferential distance between the contoured arms of the rotary star is greater than the circumferential distance between the contoured arms of the passive star; and
   a guide section configured to constrain said articles during separation of one of said articles from the next following one of said articles, and to move said one of said articles along a generally tangential path relative to both said star wheel and said passive star wheel upon further rotation of said star wheel apparatus, the guide section having a guide surface facing the rotary star wheel, wherein a distance between the guide surface and a path of the articles passing through the passive star wheel and the rotary star wheel is substantially constant.

2. The article handling machine of claim 1 in which the plurality of circumferentially spaced contoured arms each have a leading edge and a trailing edge, said leading edge defining said pocket and said trailing edge defining a cam surface, said cam surface being shaped to assist in separating said first one of said articles from said second one of said articles and to assist in moving said first one of said articles along a generally tangential path and into said pocket of the next following one of said contoured arms.

3. The article handling machine of claim 2 wherein said passive star wheel assists in separating directly adjacent articles to allow the leading article to be transferred directly to the processing station.

4. The article handling machine of claim 3 in which said trailing edge of said one of said contoured arms on said star wheel is shaped to move a third one of said articles into contact with the trailing edge of the next adjacent one of said contoured arms when the second one of said articles is moved into said pocket of said adjacent one of said contoured arms.

5. The article handling machine of claim 1 including two guides with interior surfaces shaped to guide the articles as the articles are being moved by the star wheel and the passive star wheel toward the processing station.

6. The article handling station of claim 1 wherein said passive star wheel rotates on an axis parallel to the longitudinal axis of the articles being processed.

7. The article handling station of claim 6 wherein said star wheel rotates on an axis parallel the axis of rotation of the passive star wheel.

8. The method of moving articles to a processing station which comprises;
   supplying a linear stream of articles to a processing station, a first one of said articles positioned in front of and in physical contact with a second one of said articles and said second one of said articles positioned in front of and in physical contact with a third one of said articles,
   individually moving one-by-one said articles from said conveyor to a downstream processing station using a star wheel apparatus, said star wheel apparatus having a plurality of contoured arms and at least one pocket shaped to at least partially receive one of said articles for transport of said one of said articles from said conveyor to said processing station along a tangential path relative to said star wheel apparatus;
   using a passive star wheel with a plurality of contoured arms separated by concave pockets in said passive star wheel for receiving one-by-one said articles and for assisting in separating each article from the next following article wherein the circumferential distance between the contoured arms of the rotary star is greater than the circumferential distance between the contoured arms of the passive star; and
   providing a guide section to constrain said articles during separation of one of said articles from the next following one of said articles, and force each said article being separated from the next following article to move along a generally tangential path relative to both said star wheel and said passive star wheel upon rotation of said star wheel apparatus, the guide section having a guide surface facing the star wheel apparatus, wherein a distance between the guide surface and a path of the articles passing through the passive star wheel and the star wheel apparatus is substantially constant.

9. An article handling machine comprising:
   a conveyor for supplying articles to a processing station, a first one of said articles in front of and in physical contact with a second one of said articles and said second one of said articles in front of and in physical contact with a third one of said articles;
   a rotary star wheel apparatus for individually moving one-by-one said articles from said conveyor to a downstream processing station, said star wheel apparatus having a plurality of contoured arms and at least one pocket shaped to at least partially receive one of said articles for transport of said one of said articles from said conveyor to said processing station;
   a passive star wheel with a plurality of contoured arms separated by concave pockets for receiving one-by-one said articles and for separating each article from the next following article wherein the circumferential distance between the contoured arms of the rotary star is greater than the circumferential distance between the contoured arms of the passive star; and
   a guide section for constraining said one of said articles during separation from the next following article to move along a generally tangential path relative to both said star wheel and said passive star wheel upon further rotation of said star wheel apparatus, the guide section having a guide surface facing the rotary star wheel, wherein a distance between the guide surface and a path of the articles passing through the passive star wheel and the rotary star wheel is substantially constant.

* * * * *